United States Patent
Ohnemus

(10) Patent No.: US 11,421,802 B2
(45) Date of Patent: Aug. 23, 2022

(54) ADJUSTABLE FITTING ASSEMBLY

(71) Applicant: ASC Engineered Solutions, LLC, Exeter, NH (US)

(72) Inventor: Gregory Nicholas Stagliano Ohnemus, Providence, RI (US)

(73) Assignee: ASC Engineered Solutions, LLC, Exeter, NH (US)

( * ) Notice: Subject to any disclaimer, the term of this patent is extended or adjusted under 35 U.S.C. 154(b) by 0 days.

(21) Appl. No.: 17/245,567

(22) Filed: Apr. 30, 2021

(65) Prior Publication Data
US 2021/0247001 A1 Aug. 12, 2021

Related U.S. Application Data

(60) Division of application No. 16/878,483, filed on May 19, 2020, now Pat. No. 11,028,945, which is a continuation of application No. 16/117,835, filed on Aug. 30, 2018, now Pat. No. 10,816,108.

(51) Int. Cl.
*F16L 3/20* (2006.01)
*A62C 35/68* (2006.01)
*F16B 7/04* (2006.01)

(52) U.S. Cl.
CPC ............... *F16L 3/20* (2013.01); *A62C 35/68* (2013.01); *F16B 7/048* (2013.01); *F16B 7/0446* (2013.01)

(58) Field of Classification Search
CPC ........ F16B 7/0446; F16B 7/048; F16B 2/065; F16B 5/021; B61D 28/00; B61D 28/002; B25B 5/10; B25B 5/101
See application file for complete search history.

(56) References Cited

U.S. PATENT DOCUMENTS 763,987 A * 7/1904 Kriebel ................. F16L 3/00
248/70
981,470 A 1/1911 Postel
(Continued)

OTHER PUBLICATIONS

Ohnemus, Gregory Nicholas Stagliano; Corrected Notice of Allowance for U.S. Appl. No. 16/117,835, filed Aug. 20, 2018, dated Sep. 15, 2020, 6 pgs.
(Continued)

*Primary Examiner* — Nkeisha Smith
(74) *Attorney, Agent, or Firm* — Taylor English Duma LLP

(57) ABSTRACT

A fitting assembly can include a socket fitting comprising an end wall and a substantially cylindrical sidewall extending from the end wall, the end wall and cylindrical sidewall defining a cylindrical interior recess, the cylindrical sidewall defining an open end opposite the end wall allowing access to the cylindrical interior recess, the cylindrical interior recess configured to receive a first end portion of a brace member, a bore formed through the end wall and a hole formed through the cylindrical sidewall; a first fastener engaged with the hole and extending into the cylindrical interior recess, the first fastener configured to couple the brace member to the socket fitting; and a second fastener defining a tail end engaged with the bore, the second fastener repositionable relative to the socket fitting to adjust a length of the fitting assembly, wherein the second fastener is oriented perpendicular to the first fastener.

18 Claims, 7 Drawing Sheets

(56) References Cited

U.S. PATENT DOCUMENTS

| | | | |
|---|---|---|---|
| 2,439,063 A * | 4/1948 | Shur | E04H 12/32 |
| | | | 248/536 |
| 2,470,992 A | 5/1949 | Kindorf et al. | |
| 2,678,786 A | 5/1954 | Kindorf | |
| 2,865,587 A * | 12/1958 | D Azzo | F16L 3/24 |
| | | | 248/72 |
| 2,931,605 A * | 4/1960 | Kelly | F16L 3/133 |
| | | | 248/59 |
| 3,129,915 A | 4/1964 | Budnick | |
| 3,146,982 A | 9/1964 | Budnick | |
| 3,266,762 A * | 8/1966 | Evans | F16L 3/14 |
| | | | 248/72 |
| 3,321,161 A | 5/1967 | Hirt | |
| 3,341,909 A | 9/1967 | Havener et al. | |
| 3,528,634 A | 9/1970 | Jenkins | |
| 3,563,504 A | 2/1971 | Gordon et al. | |
| 3,572,623 A | 3/1971 | Lapp | |
| 3,902,931 A | 9/1975 | Danciger et al. | |
| 4,244,545 A | 1/1981 | Berry | |
| 4,306,696 A | 12/1981 | Pondman | |
| 4,570,885 A | 2/1986 | Heath | |
| 4,697,770 A | 10/1987 | Kirschner | |
| 5,004,193 A | 4/1991 | Kirschner | |
| 5,197,819 A | 3/1993 | Hughes | |
| 5,630,576 A | 5/1997 | Williams | |
| 5,947,424 A | 9/1999 | Heath | |
| 6,098,942 A | 8/2000 | Heath | |
| 6,273,372 B1 | 8/2001 | Heath | |
| 6,898,905 B1 | 5/2005 | Kirschner | |
| 7,467,765 B2 | 12/2008 | Heath | |
| 7,654,043 B2 | 2/2010 | Heath | |
| 7,722,014 B2 | 5/2010 | Godwin | |
| 8,070,113 B1 * | 12/2011 | Kirschner | F16L 3/245 |
| | | | 248/65 |
| 8,132,767 B2 | 3/2012 | Oh et al. | |
| 8,726,607 B1 | 5/2014 | Kirschner | |
| 8,800,938 B2 * | 8/2014 | Heath | F16L 3/00 |
| | | | 248/68.1 |
| 8,857,771 B2 | 10/2014 | Streetman | |
| 8,881,348 B2 | 11/2014 | Teranishi | |
| 8,882,056 B2 | 11/2014 | Greenfield | |
| RE45,825 E | 12/2015 | Magno, Jr. et al. | |
| 9,464,665 B2 | 10/2016 | Heath | |
| 9,683,681 B2 * | 6/2017 | Heath | F16L 3/133 |
| 9,777,870 B2 * | 10/2017 | Roth | F16L 3/11 |
| 10,100,973 B2 | 10/2018 | Anderson | |
| 10,605,382 B2 | 3/2020 | Ohnemus | |
| 10,816,108 B2 | 10/2020 | Ohnemus | |
| 11,028,945 B2 | 6/2021 | Ohnemus | |
| 11,060,638 B2 | 7/2021 | Ohnemus | |
| 2004/0031887 A1 | 2/2004 | Heath | |
| 2004/0031896 A1 | 2/2004 | Heath | |
| 2004/0195479 A1 | 10/2004 | Gulley | |
| 2006/0024127 A1 | 2/2006 | Heath | |
| 2009/0183463 A1 * | 7/2009 | Osborn | F16L 3/24 |
| | | | 52/745.21 |
| 2010/0207311 A1 | 8/2010 | Smith et al. | |
| 2013/0153737 A1 | 6/2013 | Zoeteman | |
| 2013/0214098 A1 | 8/2013 | Greenfield | |
| 2015/0252915 A1 * | 9/2015 | Heath | F16L 3/08 |
| | | | 52/745.21 |
| 2015/0252916 A1 * | 9/2015 | Heath | F16L 3/11 |
| | | | 52/745.21 |
| 2016/0208838 A1 | 7/2016 | Allmon | |
| 2016/0252197 A1 * | 9/2016 | Roth | F16L 3/133 |
| | | | 248/548 |
| 2020/0063898 A1 | 2/2020 | Ohnemus | |
| 2020/0072393 A1 | 3/2020 | Ohnemus | |
| 2020/0182380 A1 | 6/2020 | Ohnemus | |
| 2020/0284378 A1 | 9/2020 | Ohnemus | |
| 2021/0285572 A1 | 9/2021 | Ohnemus | |

OTHER PUBLICATIONS

Ohnemus, Gregory Nicholas Stagliano; Corrected Notice of Allowance for U.S. Appl. No. 16/117,835, filed Aug. 30, 2018, dated Aug. 17, 2020, 6 pgs.

Ohnemus, Gregory Nicholas Stagliano; Final Office Action for U.S. Appl. No. 16/117,835, filed Aug. 30, 2018, dated Mar. 23, 2020, 19 pgs.

Ohnemus, Gregory Nicholas Stagliano; Non-Final Office Action for U.S. Appl. No. 16/117,835, filed Aug. 30, 2018, dated Oct. 7, 2019, 20 pgs.

Ohnemus, Gregory Nicholas Stagliano; Non-Final Office Action for U.S. Appl. No. 16/117,835, filed Aug. 30, 2018, dated May 11, 2020, 14 pgs.

Ohnemus, Gregory Nicholas Stagliano; Notice of Allowance for U.S. Appl. No. 16/117,835, filed Aug. 30, 2018, dated Jun. 2, 2020, 7 pgs.

Ohnemus, Gregory Nicholas Stagliano; Corrected Notice of Allowance for U.S. Appl. No. 16/878,483, filed May 19, 2020, dated May 11, 2021, 6 pgs.

Ohnemus, Gregory Nicholas Stagliano; Final Office Action for U.S. Appl. No. 16/878,483, filed May 19, 2020, dated Nov. 16, 2020, 21 pgs.

Ohnemus, Gregory Nicholas Stagliano; Non-Final Office Action for U.S. Appl. No. 16/878,483, filed May 19, 2020, dated Aug. 13, 2020, 12 pgs.

Ohnemus, Gregory Nicholas Stagliano; Notice of Allowance for U.S. Appl. No. 16/878,483, filed May 19, 2020, dated Feb. 2, 2021, 12 pgs.

Ohnemus, Gregory Nicholas Stagliano; Requirement for Restriction/Election for U.S. Appl. No. 16/878,483, filed May 19, 2020, dated Jun. 26, 2020, 5 pgs.

Eaton; Product Catalog for Seismic Bracing TOLCO™ Fig. 980—Universal Swivel Sway Brace Attachment—⅜"—to ¾"—10 rods and TOLCO™ Fig. 980H—Universal Swivel Sway Brach Attachment—⅞"/"—9 to 1¼"—7 rods, publicly available prior to Mar. 13, 2018, 1 pg.

NUSIG / Badger Industries; Installation Detail for SSC Seismic Hardware, publicly available prior to Mar. 13, 2018, 1 pg.

NUSIG / Badger Industries; Installation Detail for SVC & SBEMT Seismic Hardware, publicly available prior to Mar. 13, 2018, 3 pgs.

NVENT; Product Catalog for Universal Structural Bracket (CSBU1), publicly available prior to Mar. 13, 2018, 2 pgs.

NVENT; Product Catalog for Universal Structural Bracket (CSBU2), publicly available prior to Mar. 13, 2018, 2 pgs.

Ohnemus, Gregory Nicholas Stagliano; Final Office Action for U.S. Appl. No. 16/107,297, filed Aug. 21, 2018, dated Oct. 31, 2019, 10 pgs.

Ohnemus, Gregory Nicholas Stagliano; Non-Final Office Action for U.S. Appl. No. 16/107,297, filed Aug. 21, 2018, dated Jun. 27, 2019, 12 pgs.

Ohnemus, Gregory Nicholas Stagliano; Notice of Allowance for U.S. Appl. No. 16/107,297, filed Aug. 21, 2018, dated Dec. 16, 2019, 8 pgs.

Pentair; Product Catalog for Universal Structural Attachment Fitting (CSBUNIV), copyright 2009-2017, 9 pgs.

PHD Manufacturing, Inc.; Product Catalog for Seismic Bracing C-Clamp Structural Attachment, publicly available prior to Mar. 13, 2018, 2 pgs.

Ohnemus, Gregory Nicholas Stagliano; Final Office Action for U.S. Appl. No. 16/793,029, filed Feb. 18, 2020, dated Jan. 7, 2021, 10 pgs.

Ohnemus, Gregory Nicholas Stagliano; Non-Final Office Action for U.S. Appl. No. 16/793,029, filed Feb. 18, 2020, dated Nov. 16, 2020, 19 pgs.

Ohnemus, Gregory Nicholas Stagliano; Non-Final Office Action for U.S. Appl. No. 16/793,029, filed Feb. 18, 2020, dated Sep. 3, 2020, 24 pgs.

Ohnemus, Gregory Nicholas Stagliano; Notice of Allowance for U.S. Appl. No. 16/793,029, filed Feb. 18, 2020, dated Mar. 10, 2021, 13 pgs.

Ohnemus, Gregory Nicholas Stagliano; Supplemental Notice of Allowance for U.S. Appl. No. 16/793,029, filed Feb. 18, 2020, dated Apr. 28, 2021, 7 pgs.

(56) References Cited

OTHER PUBLICATIONS

Ohnemus, Gregory Nicholas Stagliano; Supplemental Notice of Allowance for U.S. Appl. No. 16/793,029, filed Feb. 18, 2020, dated Jun. 14, 2021, 7 pgs.

Ohnemus, Gregory Nicholas Stagliano; Non-Final Office Action for U.S. Appl. No. 17/333,391, filed May 28, 2021, dated Jun. 21, 2022, 27 pgs.

Ohnemus, Gregory Nicholas Stagliano; Requirement for Restriction/Election for U.S. Appl. No. 17/333,391, filed May 28, 2021, dated May 2, 2022, 6 pgs.

* cited by examiner

ADJUSTABLE FITTING ASSEMBLY

CROSS-REFERENCE TO RELATED APPLICATIONS

This application is a divisional of U.S. application Ser. No. 16/878,483, filed May 19, 2020, which is a continuation of U.S. application Ser. No. 16/117,835, filed Aug. 30, 2018, now issued as U.S. Pat. No. 10,816,108 on Oct. 27, 2020, both of which are hereby incorporated by reference herein in their entireties.

TECHNICAL FIELD

This disclosure relates to fittings. More specifically, this disclosure relates to a fitting assembly that is adjustable in length.

BACKGROUND

Piping systems, such as fire sprinkler system piping and HVAC piping, can be mounted in a structure (e.g., a building) by a piping support assembly (e.g., hangers, stanchions, slides, guides, seismic braces, rollers, etc.). Some piping systems are subject to dynamic loads (e.g., seismic loads from an earthquake). Piping support assemblies can employ a sway brace to allow for movement of the piping system along with the structure in response to dynamic loads.

Further, pipes and piping systems can be supported by piping support assemblies at varying distances from the structure. Piping support assemblies (e.g., a seismic brace assembly) are typically of a fixed length, making it difficult to accommodate for varying distances between piping systems and the structure they are mounted to. For example, if the distance between the piping system and the supporting structure varies, a fixed-length piping support assembly may not be compatible with the entire piping system.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a fitting assembly comprising a fitting, the fitting defining a threaded bore and a threaded hole, a set screw engaged with the threaded hole; and a fastener engaged with the threaded bore, the fastener repositionable relative to the fitting to adjust a length of the fitting assembly.

Also disclosed is a fitting assembly comprising a fitting comprising a threaded bore; and a fastener comprising a threaded portion engaged with the threaded bore, the fastener selectively repositionable relative to the fitting between a first orientation and a second orientation, the fastener having an effective length L, wherein the effective length L in the first orientation is greater than the effective length L of the fastener in the second orientation.

A method for adjusting the length of a fitting assembly is disclosed, the method comprising engaging a threaded fastener with a threaded bore of a fitting; and repositioning the threaded fastener relative to the fitting from a first position to a second position to adjust a length of the fitting assembly.

Also disclosed is a method for attaching a fitting assembly to a brace member comprising inserting the brace member into a socket of the fitting assembly, the fitting assembly comprising an adjustable fastener for adjusting a length of the fitting assembly, the adjustable fastener concentric to the brace member; and tightening a set screw to secure the brace member to the fitting assembly.

Disclosed is a fitting assembly comprising a jaw fitting comprising a body, a first jaw extending from the body, and a second jaw extending from the body, the first jaw oriented substantially parallel to the second jaw, the jaw fitting defining a bore formed through the body and a hole formed through the first jaw, the jaw fitting further defining a slot between the first jaw and second jaw; a first fastener engaged with the hole and extending into the slot, the first fastener configured to couple a brace member to the jaw fitting; and a second fastener defining a tail end engaged with the bore, the second fastener repositionable relative to the jaw fitting to adjust a length of the fitting assembly, wherein the second fastener is oriented perpendicular to the first fastener.

Also disclosed is a fitting assembly comprising a socket fitting comprising an end wall and a substantially cylindrical sidewall extending from the end wall, the end wall and cylindrical sidewall defining a cylindrical interior recess, the cylindrical sidewall defining an open end opposite the end wall allowing access to the cylindrical interior recess, the cylindrical interior recess configured to receive a first end portion of a brace member, a bore formed through the end wall and a hole formed through the cylindrical sidewall; a first fastener engaged with the hole and extending into the cylindrical interior recess, the first fastener configured to couple the brace member to the socket fitting; and a second fastener defining a tail end engaged with the bore, the second fastener repositionable relative to the socket fitting to adjust a length of the fitting assembly, wherein the second fastener is oriented perpendicular to the first fastener.

A method for adjusting a length of a fitting assembly is also disclosed, the method comprising providing the fitting assembly, the fitting assembly comprising a tubular brace member and a fitting, the tubular brace member comprising a cylindrical sidewall defining a cylindrical hollow interior, the fitting defining a bore and a hole; inserting a first fastener through the hole and engaging the cylindrical sidewall with the first fastener to couple the fitting to the tubular brace member; engaging a tail end of a second fastener with the bore, the second fastener selectively repositionable relative to the fitting between a first orientation and a second orientation; and repositioning the second fastener relative to the fitting to reposition the second fastener between the first orientation and the second orientation.

Additionally, disclosed is a method of assembling a fitting assembly, the method comprising providing a tubular brace member and a fitting, the fitting defining a substantially cylindrical sidewall, the substantially cylindrical sidewall defining a cylindrical interior recess, the substantially cylindrical sidewall further defining an open end allowing access to the cylindrical interior recess; inserting a first end portion of the tubular brace member through the open end into the cylindrical interior recess; and coupling the tubular brace member to the fitting.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
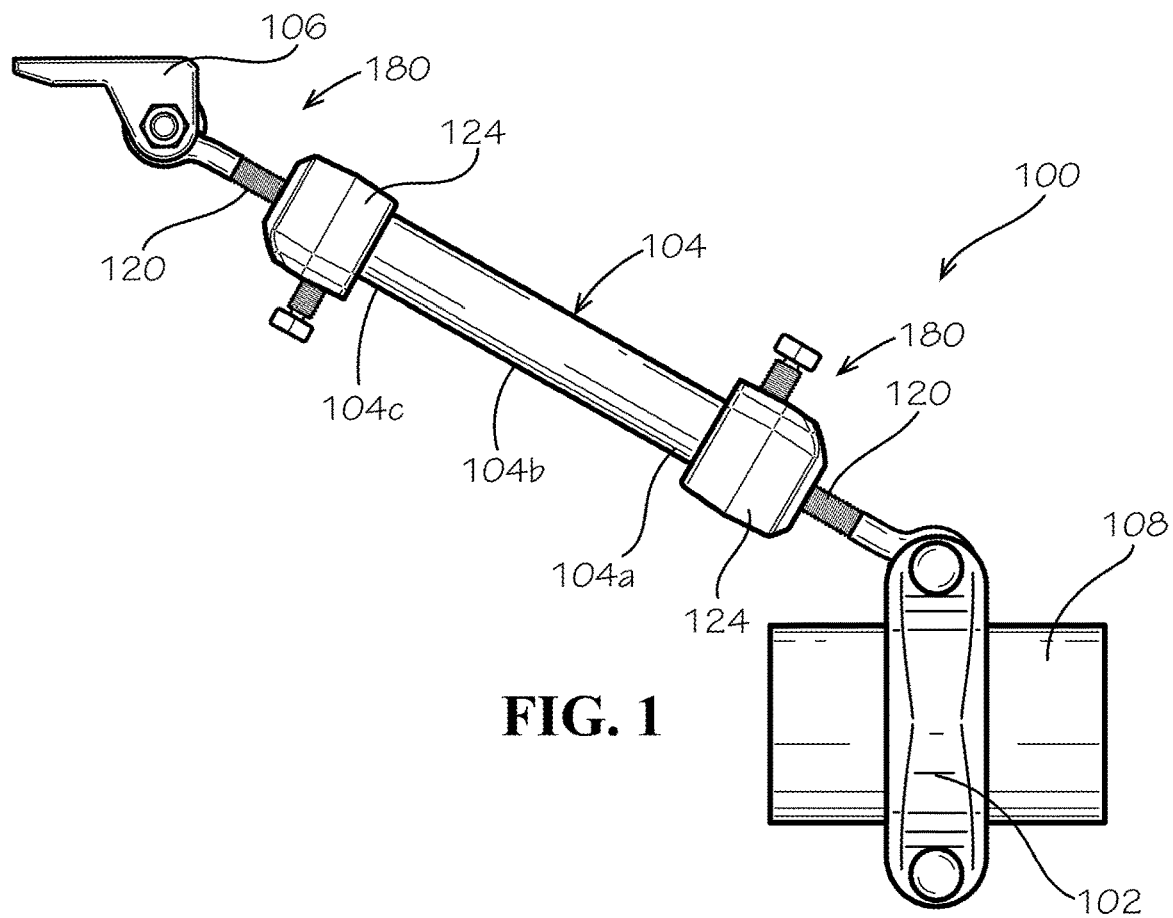
FIG. 1 shows a side view of a pipe support assembly comprising a pair of adjustable fitting assemblies, a pipe clamp, a brace member, and a mounting bracket, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a fitting assembly and associated methods, systems, devices, and various apparatus. Example aspects of the fitting assembly can comprise a fitting and a fastener that can be selectively adjustable relative to the fitting. It would be understood by one of skill in the art that the disclosed fitting assembly is described in but a few exemplary aspects among many. No particular terminology or description should be considered limiting on the disclosure or the scope of any claims issuing therefrom.

FIG. 1 illustrates a first aspect of a fitting assembly 180, according to the present disclosure. The fitting assembly 180 can comprise a fitting 124 and an adjustable fastener 120 connected to the fitting 124. Example aspects of the fastener 120 can be selectively adjustable relative to the fitting 124 to adjust a length of the fitting 124, as will be described in further detail below.

As shown, the fitting assembly 180 can be configured for use with a pipe support assembly 100 in some aspects. The pipe support assembly 100 can comprise the pipe clamp 102, the brace member 104, and the mounting bracket 106, and can be configured for mounting a pipe 108 or piping system to a structure (e.g., a building). In example aspects, the brace member 104 can extend between the pipe clamp 102 and the mounting bracket 106, and the distance between the pipe clamp 102 and the mounting bracket 106 can be selectively adjustable. Moreover, example aspects of the brace member 104 can be configured for rotational motion with respect to the pipe clamp 102 and/or the mounting bracket 106.

The pipe support assembly 100 can comprise a pair of the fitting assemblies 180. The fitting assemblies 180 can attach the pipe clamp 102 and the mounting bracket 106 to the brace member 104. Example aspects of the brace member 104 can be formed as a hollow cylindrical tube defining a first end portion 104a, an opposing second end portion 104c, and an intermediate portion 104b extending therebetween. For example, the brace member 104 can be a one-inch Schedule 40 steel pipe, or another type and size of pipe that is known in the art. The ends of the hollow brace member 104 can be open to allow access to the interior of the brace member 104, as depicted. In some aspects, the brace member 104 can define end walls (not shown) or other closures for closing the open ends. Brace member 104 can be formed from any material or combination of materials that are known in the art, including but not limited to metal, plastic, resin, synthetic materials, and fibers.

Figure 2:
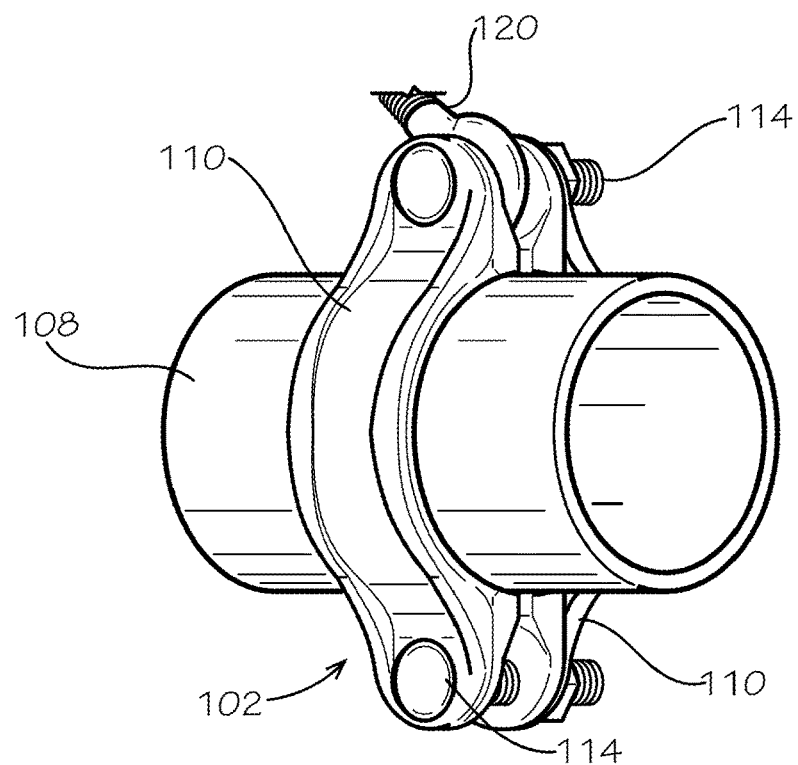
FIG. 2 shows a perspective view of the pipe clamp of FIG. 1 in engagement with a pipe.

FIG. 2 illustrates an example aspect of the pipe clamp 102. The pipe clamp 102 can engage and support a pipe 108 of a piping system, such as, for example, an indoor water sprinkler system. Pipe clamp 102 can comprise two C-shaped halves 110, each defining an outer surface and an inner surface. Inner surfaces of the C-shaped halves 110 can define a clamp channel 112 (shown in FIG. 3) through which the pipe 108 can be received. According to example aspects, C-shaped halves 110 are formed from a metal material, such as steel or cast iron, including ductile iron in some aspects. In other example aspects, C-shaped halves 110 can be formed from any material, or a combination of materials, that are known in the art, including but not limited to metal, plastic, resin, synthetic materials, and fibers.

Figure 3:
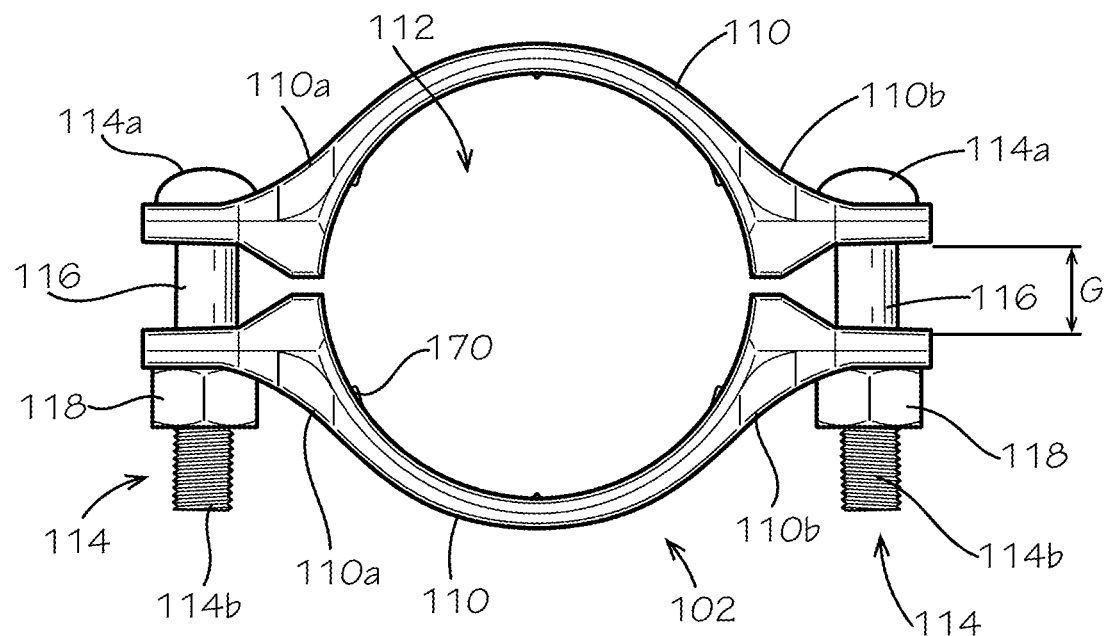
FIG. 3 shows a side view of the pipe clamp of FIG. 1.

As shown in FIGS. 2 and 3, C-shaped halves 110 can be coupled together by fasteners, such as bolts 114. Bolts 114 can be tightened such that the interior surfaces of the C-shaped halves 100 engage an outer surface of the pipe 108 at a desired strength. While two bolts 114 are shown, each at an opposing end of the C-shaped halves 100, any number of bolts 114 can be used. Bolts 114 can be, for example, track bolts, as shown. Example aspects of the track bolts 114 can be generally mushroom-shaped, comprising a dome-shaped head end 114a and a cylindrical threaded tail end 114b extending therefrom. As shown, the C-shaped halves 110 can each comprise a first end 110a and an opposing second end 110b. Openings (not shown) are formed in the first and second ends 110a, 100b of the C-shaped halves 110. The threaded tail end 114b of each bolt 114 can be configured to pass through the corresponding openings in the C-shaped halves 110. Each bolt 114 can be secured to the C-shaped halves 110, and thus the C-shaped halves 110 can be secured to one another, by coupling a mating threaded nut 118 to the threaded tail end 114b of the bolt 114. The nut 118 can be tightened against the pipe clamp 102 as desired to reach a preferred engagement strength between the pipe clamp 102 and the pipe 108. The bolt 114 and nut 118 can be formed from any suitable material, including, but not limited to, metal and plastic. Further, in other aspects, the bolts 114 can be clips, rivets, snaps, adhesive, welds, or any other fastener known in the art.

As shown, the C-shaped halves 110 are secured together such that the first ends 110a of the C-shaped halves 110 face one another and the second ends 110b of the C-shaped halves 110 face one another. In example aspects, as shown in FIG. 3, a gap G can be formed between each of the first ends 110a and the second ends 110b of the C-shaped halves 110, with an intermediate portion of a threaded tail end 114b of a corresponding bolt 114 extending through the gap G. Example aspects can comprise a bearing 116 around the intermediate portion of the bolt 114 that is positioned in gap G. Some aspects of the pipe clamp 102 can also comprise spacers (not shown) to maintain a predetermined space between the C-shaped halves 110.

Inner surfaces of the C-shaped halves 110 and/or outer surface of the pipe 108 can comprise features for improving the grip between the pipe clamp 102 and the pipe 108 for a more secure engagement between the pipe clamp 102 and the pipe 108. For example, C-shaped halves 110 can comprise a gasket and/or teeth 170 configured to grip the pipe 108 received within the clamp channel 112. The improved grip aids in preventing the pipe 108 from moving with respect to the pipe clamp 102.

According the example aspects, the profile of the clamp channel 112 can be defined by the inner surfaces of C-shaped halves 110 and can be formed to substantially match the profile of the pipe 108. For example, as depicted, the pipe 108 can define a substantially circular cross-sectional shape and the clamp channel 112 formed by the C-shaped halves 110 can also define a substantially circular cross-sectional shape. However, according to other aspects, the channel 112 of the pipe clamp 102 can be formed with any desired cross-sectional shape, including, for example, oval, square, rectangular, triangular, trapezoidal, pentagonal, etc., to match varying cross-sectional shapes of piping. Moreover, the clamp channel 112 can be sized to accept the pipe 108 therein, and the size of the clamp channel 112 can be adjusted to substantially match, or be just slightly larger than, the size of the outer periphery of the pipe 108. This adjustment can be achieved by the appropriate tightening of the threaded nuts 118 on the threaded tail end 114b of the bolts 114, such that the clearance between the outer surface of the pipe 108 and the inner surfaces of the C-shaped halves 110 can be minimal.

Figure 4:
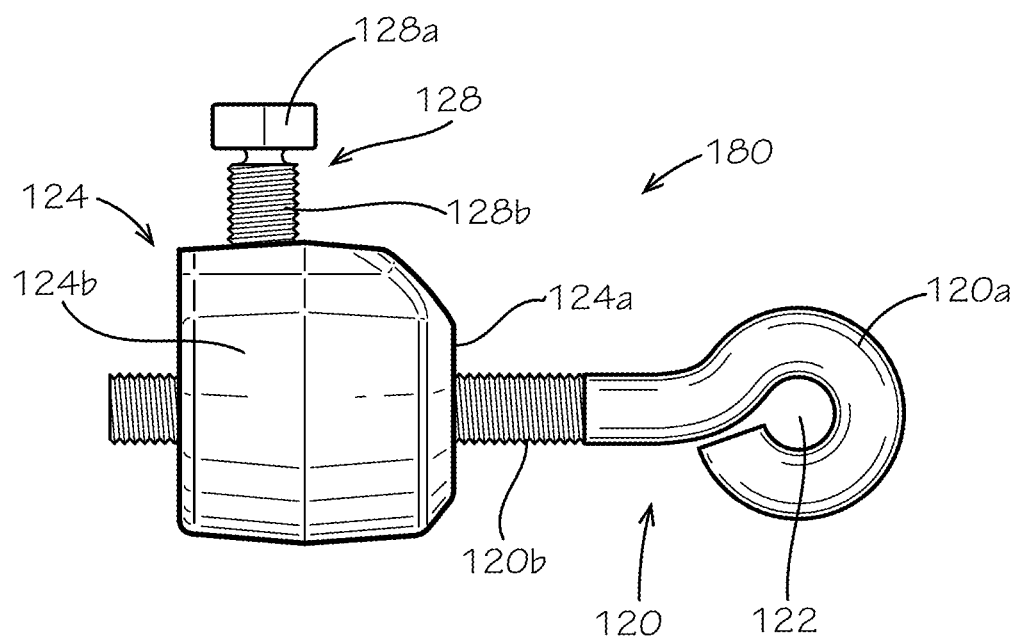
FIG. 4 shows a front view of one of the fitting assemblies of FIG. 1.

FIG. 4 illustrates an example aspect of the fitting assembly 180. As shown, the fitting assembly 180 can comprises a fitting 124 and an adjustable fastener 120. In example aspects, the fitting 124 can be formed as a socket, as shown. In other aspects, the fitting 124 can be formed as a jaw (as shown in FIGS. 10-13), or any another type of suitable fitting known in the art. The socket fitting 124 can comprise a set screw 128, or other fastener known in the art, for attaching the socket fitting 124 to the brace member 104. An example set screw 128 can comprise a hexagonal head end 128a and a cylindrical threaded tail end 128b, as shown. Example aspects the adjustable fastener 120 can be, for example, an eyebolt. As shown, the fastener 120 can define a generally O-shaped head end 120a and a cylindrical threaded tail end 120b extending therefrom.

Figure 5:
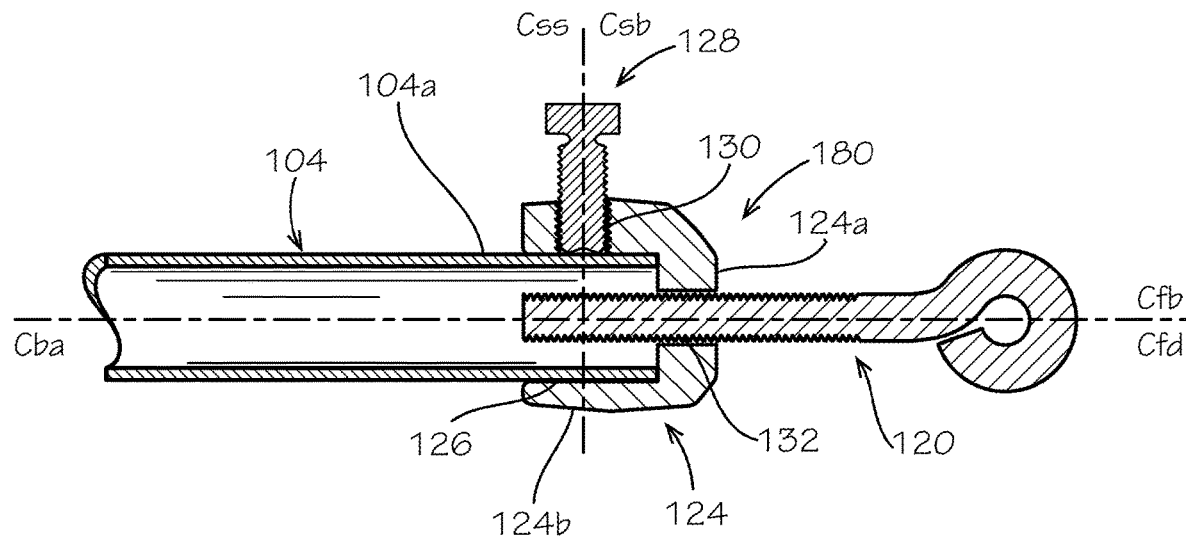
FIG. 5 shows a cross-sectional view of the fitting assembly of FIG. 4 coupled to the brace member of FIG. 1 with the fitting assembly in an intermediate configuration.

FIG. 5 illustrates a cross-sectional view of one of the socket-style fitting assemblies 180 coupled to the first end 104a of the brace member 104. As shown, the fitting 124 can comprise an end wall 124a, a circumferential side wall 124b surrounding the end wall 124a, and an open end opposite the end wall 124a, to define an interior recess 126 in the fitting 124. Example aspects of the interior recess 126 can be sized and shaped to receive the corresponding first end portion 104a of the brace member 104. A set screw bore 130 can be formed in the circumferential side wall 124b of the fitting 124. In the current aspect, the set screw bore 130 is a through hole, extending from an outer surface of the side wall 124b to an interior surface of the side wall 124b. The set screw bore 130 can be threaded to match the threading on the set screw 128, allowing the set screw 128 to be screwed into the set screw bore 130. In the example aspect of FIG. 5, a centerline axis $C_{sb}$ of the set screw bore 130 can be generally perpendicular to a centerline axis $C_{ba}$ of the brace member 104, and as such, a centerline axis $C_{ss}$ of the set screw 128 can be generally perpendicular to the centerline axis $C_{ba}$ of the brace member 104. The set screw 128 can be tightened down on the first end portion 104a of the brace member 104, biasing the first end portion 104a of the brace member 104 against the fitting 124, retaining the first end portion 104a of the brace member 104 within the fitting 124 and preventing movement of the brace member 104 with respect to the fitting 124. In various aspects, the first end portion 104a of the brace member 104 can also define a threaded set screw bore (not shown) aligned with the threaded set screw bore 130 of the fitting 124, allowing the set screw 128 to pass through and thread with both the set screw bore 130 of the fitting 124 and the set screw bore (not shown) of the brace member 104. In various aspects, the assembly of the fitting 124 and brace member 104 can comprise additional or other fasteners for attaching the fitting 124 to the first end portion 104a of the brace member 104; for example, clips, rivets, snaps, adhesive, welds, or any other fastening device known in the art.

A fastener bore 132 can be formed in the end wall 124a of the fitting 124. In the current aspect, the fastener bore 132 is a though hole, extending from an outer surface of the end wall 124a to an interior surface of the end wall 124a. The fastener bore 132 can be threaded to match the threading on the tail end 120b of the adjustable fastener 120, allowing the fastener 120 to be threaded with the fastener bore 132, and attaching the fastener 120 to the fitting 124. In example aspects, a centerline axis $C_{fb}$ of the fastener bore 132 can be substantially aligned with the centerline axis $C_{ba}$ of the brace member 104, and as such, a centerline axis $C_{fd}$ of the fastener 120 can be substantially aligned with the centerline axis $C_{ba}$ of the brace member. In such an aspect, the fastener 120 and the brace member 104 are oriented concentrically with respect to one another.

As shown in FIG. 5, the fastener 120 extends through an open end of the first end portion 104a of the brace member 104 and into the hollow interior of the brace member 104, without directly attaching to the brace member 104. While the depicted aspect illustrates a brace member 104 with open ends, other example aspects of the brace member 104 can comprise end walls (not shown) prohibiting access to the hollow interior of the brace member 104. In such example aspects, the end wall of the brace member 104 can be configured to abut the end wall 124a of the fitting 124. The end wall 124a of the brace member 104 can define a threaded fastener bore (not shown) aligned with the threaded fastener bore 132 of the fitting 124, allowing the threaded tail end 120b of the fastener 120 to pass through and thread with the fastener bore 132 of the fitting 124 and the fastener bore (not shown) of the brace member 104.

Referring back to FIG. 2, one of the pair of fitting assemblies 180 can be configured to attach to the pipe clamp 102. The O-shaped head end 120a of the fastener 120 can define an opening 122 sized and shaped to receive an intermediate portion of the bolt 114 of the pipe clamp 102. Gap G (shown in FIG. 3) can be sized to accommodate the O-shaped head end 120a of the fastener 120, with a large enough clearance between the fastener 120 and the pipe clamp 102 to allow the fastener 120 to rotate freely relative to the clamp 102. The bearing 116 can be received within the opening 122 of the fastener 120, such that it is positioned between the bolt 114 and the fastener 120 to reduce friction as the fastener 120 rotates relative to the clamp 102. As will be described in more detail below, the rotational attachment of the fastener 120 to the pipe clamp 102 also allows for movement of the brace member 104 relative to the pipe clamp 102. Note that, in other aspects, other connectors can be employed to allow for rotation of the fastener 120 with respect to the pipe clamp 102, such as, for example, a swivel bolt.

Figure 6:
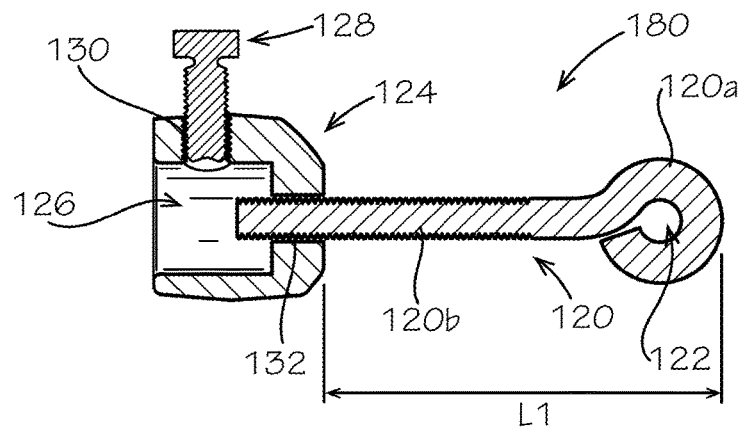
FIG. 6 is a cross-sectional view of the fitting assembly of FIG. 4 in an extended configuration.
Figure 7:
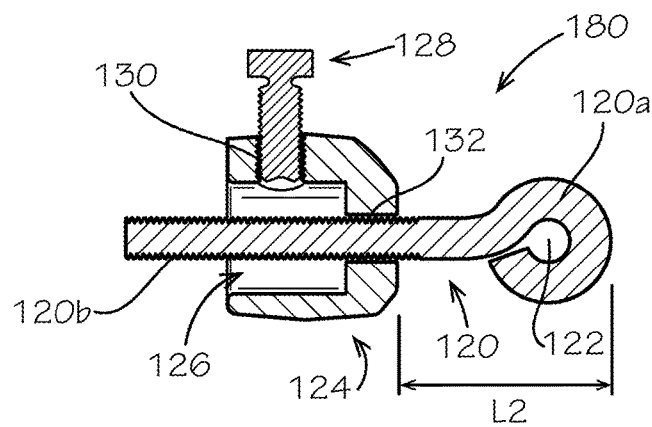
FIG. 7 is a cross-sectional view of the fitting assembly of FIG. 4 in a shortened configuration.

As described above, the fastener 120 can define a threaded tail end 120b that can engage the threaded fastener bore 132 on fitting 124. Referring to FIGS. 6 and 7, according to example aspects, the effective length of the fastener 120 can be the distance between a distal end of the fastener 120 and the fitting 124. The effective length of the fastener 120 can be selectively adjusting by adjusting the depth by which the threaded tail end 120b of the fastener 120 is threaded into the fastener bore 132. For example, as shown in FIG. 6, the fastener 120 can be only partially threaded into the fastener bore 132 of the fitting 124, with the effective length of the fastener 120 indicated by $L_1$. In another example, as shown in FIG. 7, the fastener 120 can be fully threaded into the fastener bore 132 of the fitting 124, with the effective length of the fastener 120 indicated by $L_2$. As is illustrated, effective length $L_2$ can be less than effective length $L_1$. Thus, the length of the pipe support assembly 100 can be selectively lengthened and shortened to fit the orientations of varying pipes and piping systems with respect to a mounting structure.

In a first example, it can be desired that the pipe 108 be supported eleven inches from a concrete ceiling (not shown), and the length of the pipe support assembly 100 can be twelve inches. To reduce the length of the pipe support assembly 100 so that the pipe support assembly 100 can support the pipe 108 eleven inches from the ceiling, the fastener 120 can be selectively threaded one inch deeper into the fastener bore 132 of the fitting 124, reducing the length of the pipe support assembly 100 from twelve inches to eleven inches. In a second example, it can be desired that the pipe 108 be supported thirteen inches from a concrete ceiling (not shown), and the length of the pipe support assembly 100 can be twelve inches. To increase the length of the pipe support assembly 100 so the pipe support assembly 100 can support the pipe 108 thirteen inches from the ceiling, the fastener 120 can be selectively un-threaded from the fastener bore 132 of the fitting 124 by one inch, elongating the pipe support assembly 100 to thirteen inches. It should be note that, in various aspects, the assembly of the fitting 124 and fastener 120 can comprise additional or other fasteners for attaching the fastener 120 to the fitting 124, provided that the fasteners allow for selective adjustment of the length of the pipe support assembly 100.

Figure 8:
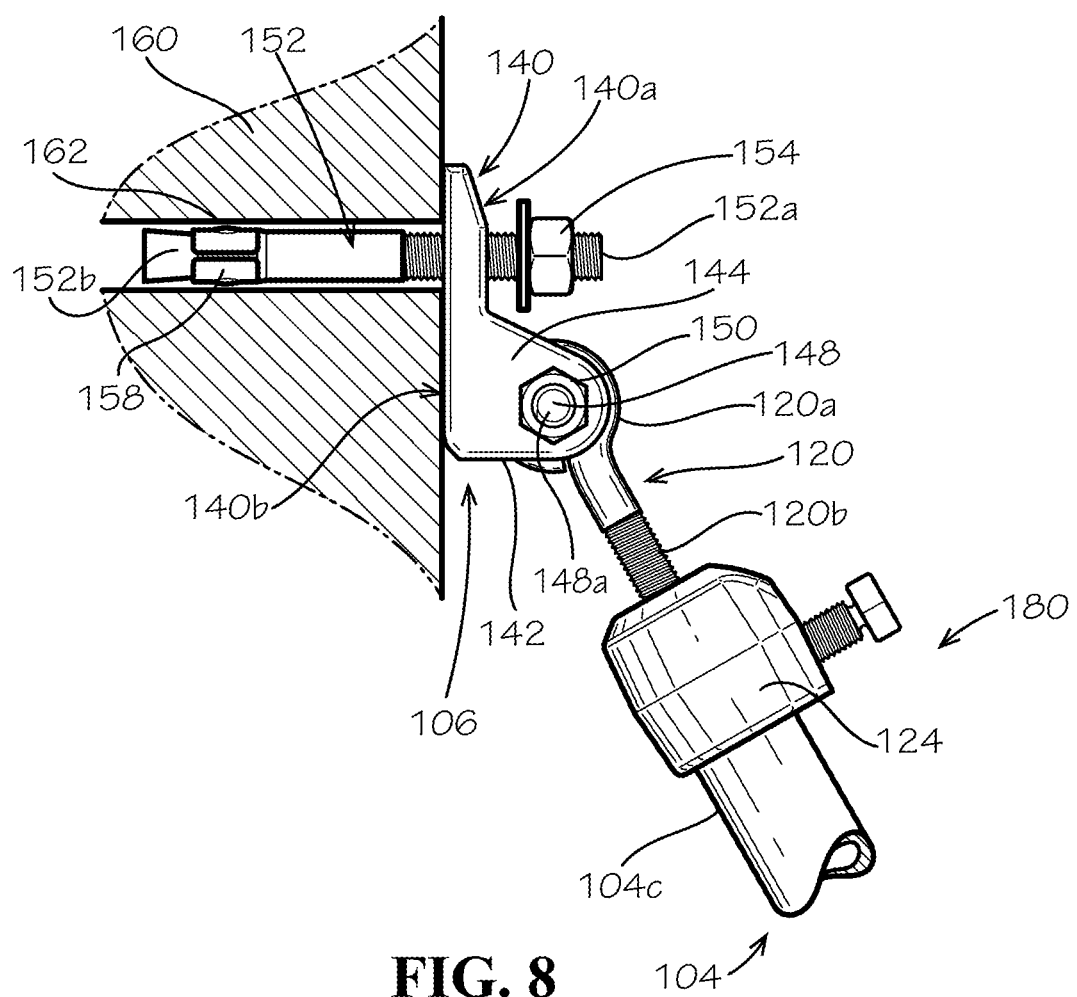
FIG. 8 shows a side view of the mounting bracket of FIG. 1 in engagement with the fitting assembly and the brace member of FIG. 1 and mounted to a structure.

FIG. 8 illustrates the other one of the fitting assemblies 180 coupling the second end portion 104c of the brace member 104 to the mounting bracket 106. Again, the fitting assembly 180 can comprises a fitting 124 configured to engage the brace member 104 and a fastener 120 configured to engage the mounting bracket 106. According to the present disclosure, the mounting bracket 106 can be configured for mounting the pipe 108 of the piping system to a structure (e.g., a building). In other aspects, the pipe 108 can be mounted to the structure with other mounting mechanisms known in the art, such as beam clamps. Example aspects of the mounting bracket 106 can comprise a mounting plate 140 configured to abut and engage a mounting structure (e.g., a wall, ceiling, floor, etc.). The mounting bracket 106 further can define a protruding portion 142 extending from the mounting plate 140. The protruding portion 142 of the mounting bracket 106 can engage the fastener 120 to attach the brace member 104 and pipe clamp 102 to the mounting bracket 106.

The protruding portion 142 of the mounting bracket 106 can comprise opposing first and second side walls 144. Note, in FIG. 8, only the first side wall 144 is shown. Each side wall 144 can define an opening (not shown) formed therein, the openings being horizontally aligned and configured to allow the passage of a fastener 148 through both side walls 144. The fastener 148 can be, for example, a cross bolt, as shown in the drawing figures. Example aspects of the cross bolt fastener 148 can define a hexagonally-shaped head end (not shown) and a cylindrical threaded tail end 148a extending therefrom. The threaded tail end 148a of the cross bolt fastener 148 can pass through the openings in the side walls 144, with the hexagonal head end (not shown) abutting an outer surface of the second side wall 144 (not shown). The cross bolt fastener 148 can be secured to the mounting bracket 106 by coupling a mating threaded nut 150 to the threaded tail end 148a of the cross bolt. The nut 150 can be tightened against the outer surface of the first side wall 144 of the mounting bracket 106, as shown. The openings (not shown) formed in the side walls 144 can be threaded or unthreaded. In some aspects, the fastener 148 can further comprise a washer (not shown) positioned between the nut 150 and the outer surface of the first side wall 144 to aid in evenly distributing the pressure of the nut 150 and in preventing loosing of the nut 150. According to example aspects, the washer can be a lock washer comprising a plurality of teeth configured to engage opposing teeth on the nut 150. In other aspects, the washer can be a plain washer. The cross bolt fastener 148 and nut 150 can be formed from any suitable material, including, but not limited to, metal and plastic. Further, in other aspects, the fastener 148 can be a clip, rivet, snap, adhesive, weld, another type of bolt, or any other fastener known in the art.

Interior surfaces of the two opposing side walls 144 of the mounting bracket 106 can be separated by a gap (not shown), with an intermediate portion of the cross bolt fastener 148 extending through the gap. According to example aspects, the fastener 120 can be rotatably coupled to an intermediate portion of the cross bolt fastener 148. Note that, in different aspects, other connectors can be employed to allow for rotation of the fastener 120 with respect to the mounting bracket 106, such as, for example, a swivel bolt.

The mounting plate 140 of the mounting bracket 106 can be coupled to the protruding portion 142 of the mounting bracket 106. Example aspects of the mounting plate 140 can define a front surface 140a and an opposite-facing rear surface 140b. The rear surface 140b of the mounting plate 140 can be configured to abut and engage a mounting structure, such as a concrete wall 160, wherein the concrete wall 160 can be part of a larger structure, such as a building. According to other aspects, the pipe support assembly 100 can be mounted to any suitable mounting structure, such as, for example, a joist, a wooden beam or blocking, a steel beam, or a concrete pillar, floor, or ceiling. According to the depicted aspect, the rear surface 140b can define a substantially flat profile to lie against and engage the substantially flat concrete wall 160. In other aspects, the rear surface 140b of the mounting plate 140 can define a non-flat profile. For example, the rear surface 140b can be curved to engage a curved mounting structure or angular to engage an angular mounting structure. The front surface 140a of the mounting plate 140 can be oriented opposite the rear surface 140b of the mounting plate, such that the front surface faces away from the mounting structure.

The mounting plate 140 of the mounting bracket 106 can define one or more through-holes (not shown) extending from the front surface 140a of the mounting plate 140 to the rear surface 140b. A mounting fastener for coupling the mounting bracket 106 to the concrete wall 160 can extend through the though-holes (not shown) to engage the concrete wall 160. For example, as is shown in the depicted example aspect, the mounting fastener can be a concrete wedge anchor 152. The concrete wedge anchor 152 can comprise a threaded rod portion 152a and an anchor portion 152b. The diameter of the anchor portion 152b tapers to a slightly smaller size away from the threaded portion 152a and then tapers back out to match the diameter of the threaded portion 152a at the end of the anchor portion 152b. A wedge clip 158 can be attached around the narrower section of the anchor portion 152b. The anchor portion 152b of the wedge anchor 152 and the wedge clip 158 can pass through the thoughhole (not shown) in the mounting plate 140 and be inserted into a passage 162 in the concrete wall 160. In example aspects, the diameter of the passage 162 in the concrete wall 160 can be substantially the same as the diameter of the anchor wedge 152 at its largest diameter. A nut 154 can be threaded onto the threaded portion 152a of the wedge anchor 152 and tightened against the front surface 140a of the mounting plate 140 to secure the mounting bracket 106 against the concrete wall 160. As the nut 154 is tightened, the wedge anchor 152 is drawn partially out of the passage 162, wedging the wedge clip 158 between the wide end of the anchor portion 152b and the walls of the concrete passage 162. In other aspects, the mounting bracket 106 can be fastened to the concrete wall 160 using any other suitable mounting fastener known in the art, such as, for example, bolts, clips, rivets, snaps, adhesives, or welds. According to example aspects, the fastener 120 of each fitting assembly 180 can be threaded and unthreaded with respect to its corresponding fitting 124, such that the length of the pipe support assembly 100 can be selectively adjusted at the first end portion 104a of the brace member 104 and the second end portion 104c of the brace member 104. Allowing for length adjustment on both ends of the brace member 104 increases the range of lengths that can be achieved by the pipe support assembly 100. In one example, it can be desired that pipe 108 be supported twelve inches from a ceiling, and the length of the pipe support assembly 100 is fourteen inches. To reduce the length of the pipe support assembly 100 so that the pipe support assembly 100 can support the pipe 108 twelve inches from the ceiling, each fastener 120 can be selectively threaded one inch deeper into the corresponding fitting 124, reducing the length of the pipe support assembly 100 from fourteen inches to twelve inches.

Figure 9:
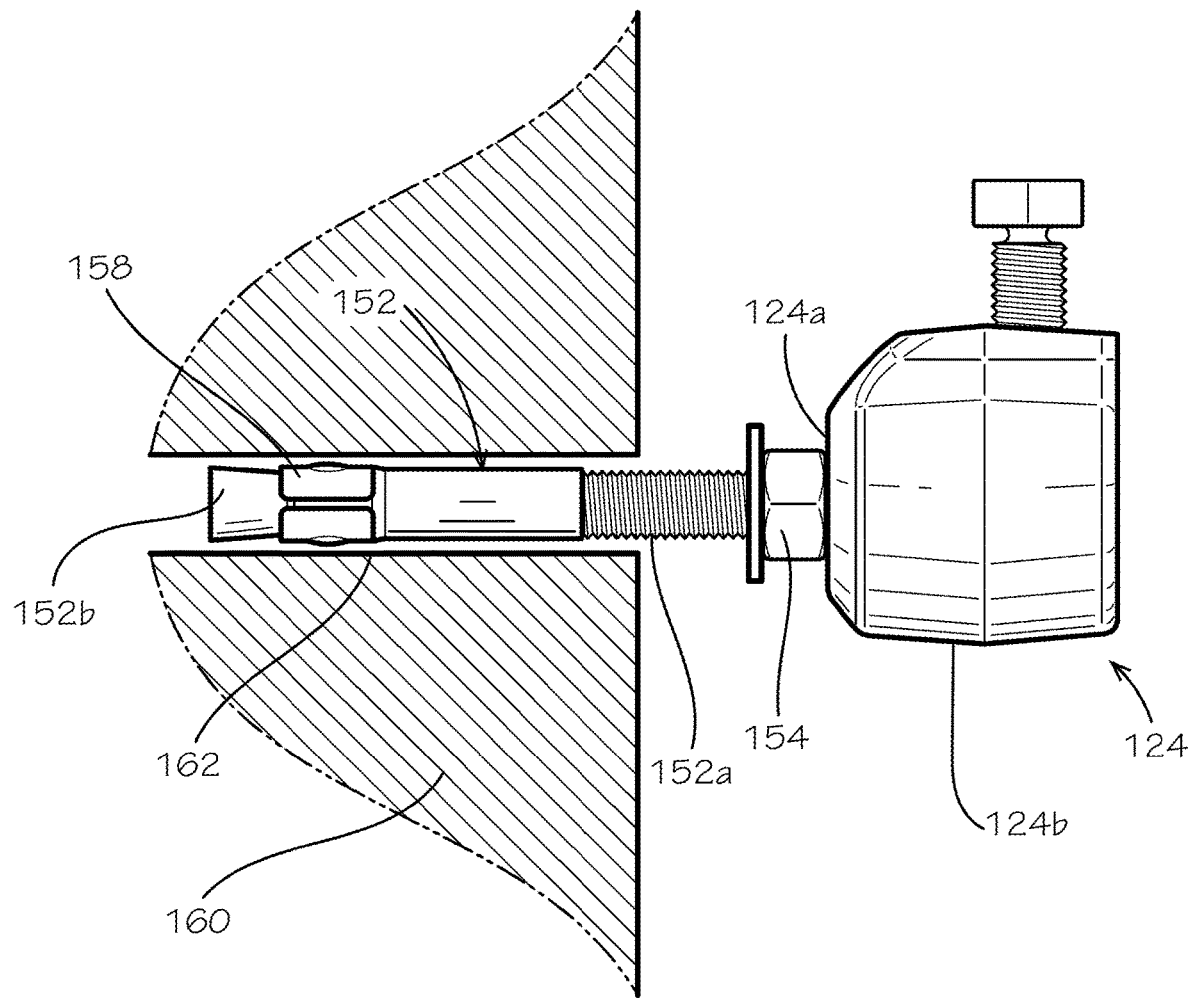
FIG. 9 shows a side view of a fastening assembly for attaching a brace member directly to a mounting structure with a fitting assembly.

According to another aspect of the current disclosure, the brace member 104 can be mounted directly to a mounting structure, without the need for a mounting bracket 106. For example, as shown in FIG. 9, the fastener 120 of FIG. 8 can be replaced with a concrete wedge anchor 152 for attaching the pipe support assembly 100 to a concrete wall 160. The concrete wedge anchor 152 comprises an anchor portion 152b that can be inserted into a passage 162 in the concrete mounting structure 160 and a threaded portion 152a that can be threaded with the fastener bore 132 of the fitting 124. A nut 154 can be threaded onto the threaded portion 152a and tightened against the concrete structure 160, wedging a wide end of the anchor portion 152b between a wedge clip 158 and the walls of the concrete passage 162. Further, a washer 156 can be positioned between the nut 154 and the concrete wall 160 to aid in evenly distributing the pressure of the nut 154 and to help prevent loosing of the nut 154. The length of the pipe support assembly 100 can be selectively adjusted by threading and unthreading the threaded portion 152a of the concrete wedge anchor 152 with respect to the second fitting 124'.

Figure 10:
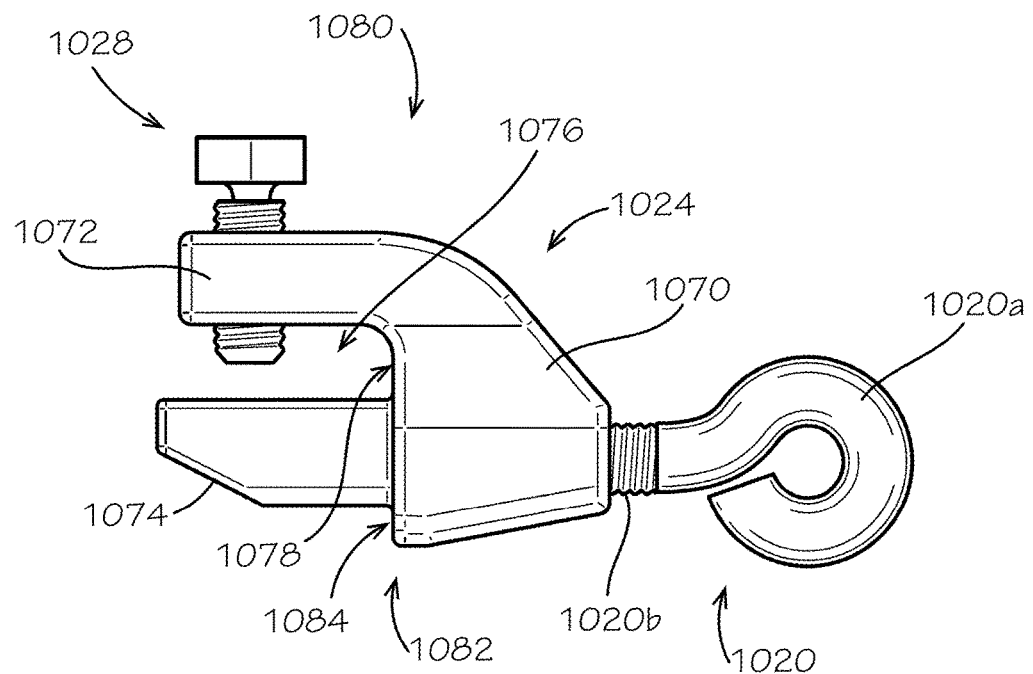
FIG. 10 is a front view of the fitting assembly, according to another aspect of the present disclosure.

FIGS. 10-13 illustrate another example aspect of a fitting assembly 1080 comprising a fitting 1024 and an adjustable fastener 1020 selectively adjustable relative to the fitting 1024. As shown in FIG. 10, the adjustable fastener 1020 can be substantially similar to the adjustable fastener 120 described above. For example, the fastener 1020 can comprise a head end 1020a and a threaded tail end 1020b extending therefrom. In example aspects, the fitting 1024 can be formed as a jaw. The jaw-style fitting 1024 can comprise a fitting body 1070, a first jaw 1072 extending from the fitting body 1070, and a second jaw 1074 extending from the fitting body 1070. The first jaw 1072 and second jaw 1074 can be fixed in a spaced relationship to define a slot 1076 therebetween. Example aspects of the slot 1076 can comprise a closed end wall 1078. As shown, example aspects of the end wall 1078 can be formed by the fitting body 1070. The fitting 1024 can further comprise a lip 1082 coupled to and extending from the fitting body 1070 and defining a lip wall 1084. The fitting 1024 can be formed from any material or combinations of materials of suitable strength, including, but not limited to, metals and plastics. In particular, the fitting body 1070, first jaw 1072, second jaw 1074, and lip 1082 can be defined in a single monolithic structure, and can be formed from cast iron or other cast material. In other aspects, any of the fitting body 1070, first jaw 1072, second jaw 1074, and lip 1082 can be separate components that are coupled to the other components of the fitting 1024.

Figure 11:
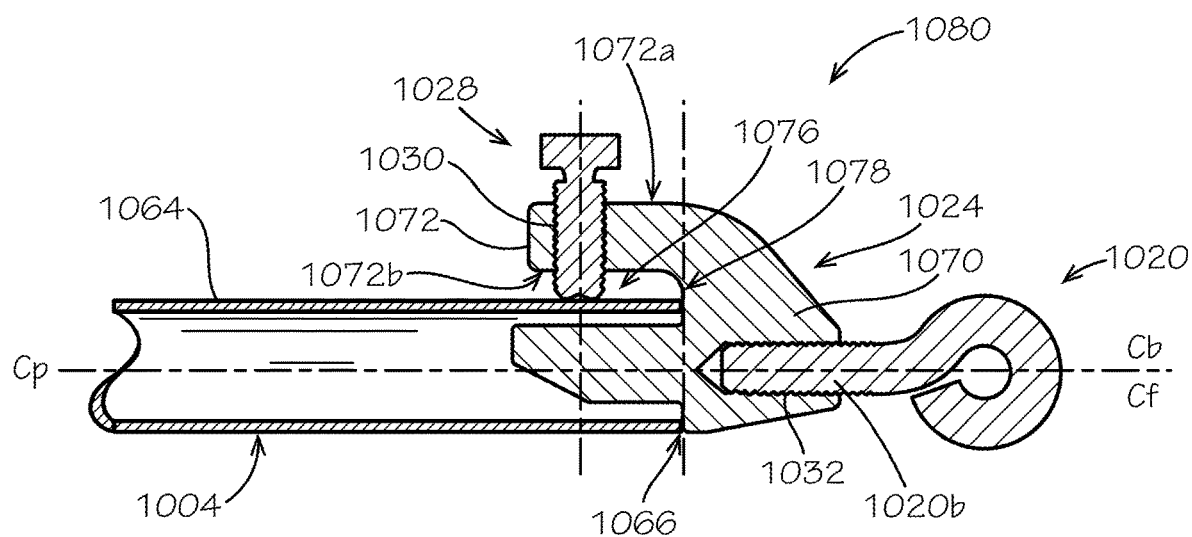
FIG. 11 is a cross-sectional view of the fitting assembly of FIG. 10 coupled to the brace member, according to another aspect of the present disclosure.

As illustrated in FIG. 11, the jaw fitting 1024 can be configured to engage a pipe, such as a brace member 1004. The brace member 1004 can be formed as a hollow cylindrical tube comprising a cylindrical side wall 1064 comprising at least one open end. The open end can be defined by a peripheral edge 1066. The slot 1076 formed in the fitting 1024 can be sized and shaped to receive a portion of the cylindrical wall 1064 at the open end of the brace member 1004. As shown, the second jaw 1074 can extend through the open end of the brace member 1004 and be positioned within the hollow interior, the hollow interior of the brace member 1004 being suitably sized to receive the second jaw 1074. The first jaw 1072 can be positioned outside of the brace member 1004, as shown. The peripheral edge 1066 of the brace member 1004 can abut the end wall 1078 of the slot 1076 at a first location along the peripheral edge 1066 and can abut the lip wall 1084 at a second location along the peripheral edge 1066. For example, in one example aspect, the end wall 1078 can abut a top side of the peripheral edge 1066 and the lip wall 1084 can abut a bottom side of the peripheral edge 1066.

The fitting 1024 can further comprise a fastener for securing the fitting 1024 to the brace member 1004. In example aspects, the fastener can be a set screw 1028. The set screw 1028 can be substantially similar to the set screw 128 described above. Furthermore, a set screw bore 1030 can be defined in the first jaw 1072 of the fitting 1024, extending from an upper surface 1072a of the first jaw 1072 to a lower surface 1072b of the first jaw 1072. The set screw bore 1030 can be substantially similar to the set screw bore 130 described above. The set screw bore 1030 can be threaded to match the threading on the set screw 1028, allowing the set screw 1028 to be screwed into the set screw bore 1030. The set screw 1028, when threaded into the set screw bore 1030, can move towards the second jaw 1074 and can bias the portion of the cylindrical side wall 1064 received within the slot 176 towards the second jaw 1074. The set screw 1028 can be sufficiently tightened such that the side wall 1064 is clamped between the set screw 1028 and the second jaw 1074, preventing movement and removal of the brace member 1004 with respect to the fitting 1024. In various aspects, additional or other fastening devices can be used for attaching the fitting 1024 to the brace member 1004; for example, clips, rivets, snaps, adhesive, welds, or any other fastener known in the art.

The threaded tail end 1020b of the fastener 1020 can adjustably engage a fastener bore 1032 can be formed in the fitting body 1070 of the first fitting 1024. In example aspects, the fastener bore 1032 can be a blind hole, as shown. The fastener bore 1032 can be threaded to match the threading on the tail end 1020b of the adjustable fastener 1020, allowing the fastener 1020 to be threaded with the fastener bore 1032, and attaching the fastener 1020 to the fitting 1024. In example aspects, a centerline axis $C_b$ of the fastener bore 1032 can be substantially aligned with the centerline axis $C_p$ of the brace member 1004, and as such, a centerline axis $C_f$ of the adjustable fastener 1020 can be substantially aligned with the centerline axis $C_p$ of the brace member 104. In such an aspect, the fastener 1020 and the brace member 1004 can be oriented concentrically with respect to one another.

Figure 12:
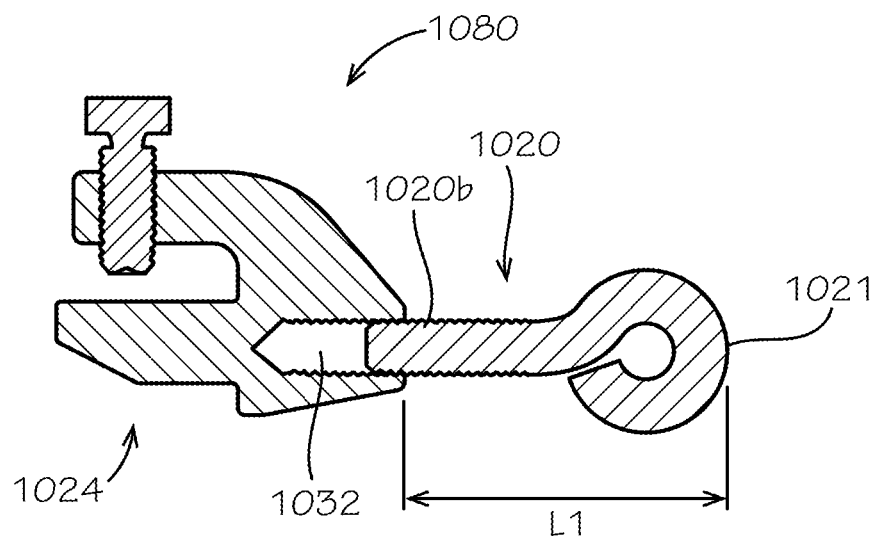
FIG. 12 is a cross-sectional view of the fitting assembly of FIG. 10 in the extended configuration.
Figure 13:
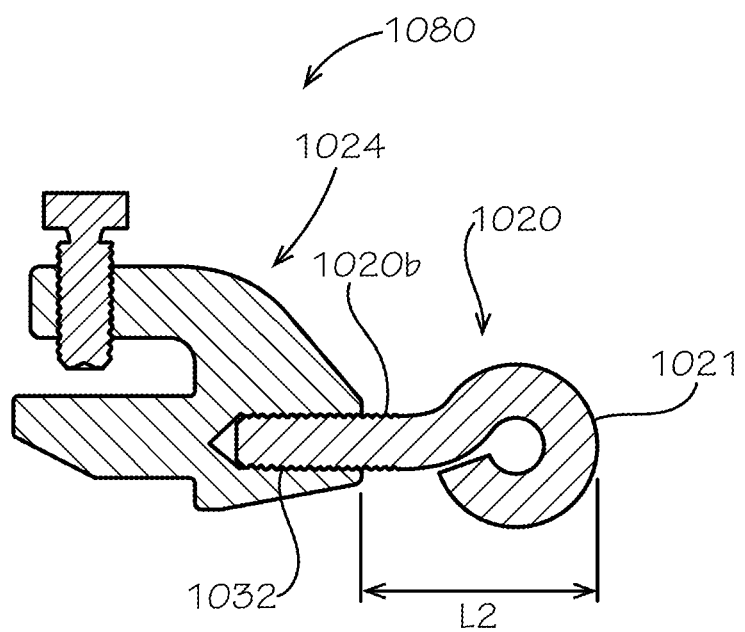
FIG. 13 is a cross-sectional view of the fitting assembly of FIG. 10 in the shortened configuration.

Referring to FIGS. 12 and 13, according to example aspects, the effective length of the adjustable fastener 1020 can be defined as the distance between a distal end 1021 of the fastener 1020 and the fitting 1024. The effective length of the fastener 1020 can be selectively adjusting by adjusting the depth by which the threaded tail end 1020b of the fastener 1024 is threaded into the fastener bore 1032 of the fitting 1024. In FIG. 12, the fastener 1020 can be partially threaded into the fastener bore 1032, such that the fitting assembly 1080 can be in an extended configuration, with the effective length of the fastener 1020 indicated by $L_1$. In FIG. 13, the fastener 1020 can be fully threaded into the fastener bore 1032, such that the fitting assembly 1080 can be in a shortened configuration, with the effective length of the fastener 1020 indicated by $L_2$. As illustrated, the effective length $L_2$ can be less than the effective length $L_1$. Thus, the length of the fitting assembly 1080 can be selectively lengthened and shortened as desired.

As discussed above, in accordance with an example aspect of the disclosure, the rotational coupling of the fitting assembly 180 to the pipe clamp 102 allows the brace member 104 to move relative to the pipe clamp 102, and the rotational coupling of the second fitting assembly 180 to the mounting bracket 106 allows the brace member 104 to move relative to the mounting bracket 106. Such freedom of movement can be desired in instances of seismic events or other events that cause a structure to move (such as the settling of a building), as the pipe support system 100 can move along with the moving structure. For example, in the event of an earthquake, a fire can occur in an affected structure. An indoor sprinkler piping system supported by such a pipe support assembly 100 can move as the structure moves, remaining attached to the structure and operational. In another example, an HVAC piping system can be installed in a structure and can be supported by such a pipe support assembly 100 as described herein. As the structure settles over time, the pipe support assembly 100 can move along with the settling structure, enabling the HVAC piping system to remain attached to the structure and operational.

Moreover, as discussed above, the length of the fitting assemblies 180,1080 described and contemplated herein can be selectively lengthened and shortened. Such adjustability provides the desirable benefit of having a single fitting assembly design capable of supporting pipes and piping systems positioned at varying distances from a mounting structure, making installation easier. For example, an indoor sprinkler piping system can comprise a first pipe to be supported ten inches from a structure and a second pipe to be supported twelve inches from a structure. The same adjustable fitting assembly design can be utilized to support both the first and second pipes at the desired distances from the mounting structure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fitting assembly comprising:
a socket fitting comprising an end wall and a substantially cylindrical sidewall extending from the end wall, the end wall and cylindrical sidewall defining a cylindrical interior recess, the cylindrical sidewall defining an open end opposite the end wall allowing access to the cylindrical interior recess, the cylindrical interior recess configured to receive a first end portion of a brace member, a bore formed through the end wall and a hole formed through the cylindrical sidewall;
a first fastener engaged with the hole and extending into the cylindrical interior recess, the first fastener configured to couple the brace member to the socket fitting; and
a second fastener defining a tail end engaged with the bore, the second fastener repositionable relative to the socket fitting to adjust a length of the fitting assembly, wherein the second fastener is oriented perpendicular to the first fastener.

2. The fitting assembly of claim 1, wherein the second fastener is repositionable within the bore between a first orientation with respect to the socket fitting, wherein the fitting assembly is in a shortened configuration, and a second orientation with respect to the socket fitting, wherein the fitting assembly is in an extended configuration.

3. The fitting assembly of claim 2, wherein the fitting assembly defines a first length in the shortened configuration and a second length in the extended configuration, wherein the first length is less than the second length.

4. The fitting assembly of claim 2, wherein the second fastener extends into the cylindrical interior recess in the shortened configuration.

5. The fitting assembly of claim 2, wherein the bore is a threaded bore, and wherein the tail end of the second fastener comprises a threaded portion rotatably engaged with the threaded bore.

6. The fitting assembly of claim 5, wherein the threaded portion of the tail end of the second fastener is fully threaded with the threaded bore in the first orientation and partially threaded with the threaded bore in the second orientation.

7. The fitting assembly of claim 1, wherein the second fastener is oriented concentric to the cylindrical interior recess.

8. The fitting assembly of claim 1, wherein the hole is a threaded hole and the first fastener is a set screw, the set screw defining a threaded tail end configured to rotatably engage the threaded hole.

9. The fitting assembly of claim 1, wherein the second fastener is an eyebolt comprising the tail end and a head end, the tail end defining threading, the head end being substantially O-shaped and defining an opening therethrough, the opening configured to receive a fastener therethrough.

10. The fitting assembly of claim 1, wherein the end wall defines a substantially planar surface facing the cylindrical interior recess, the substantially planar surface configured to abut a tubular brace member.

11. The fitting assembly of claim 1, further comprising a mounting bracket coupled to the second fastener, the mounting bracket defining a mounting plate configured to abut a mounting structure.

12. A method of assembling a fitting assembly comprising:
- providing a tubular brace member and a fitting, the fitting defining a substantially cylindrical sidewall, the substantially cylindrical sidewall defining a cylindrical interior recess, the substantially cylindrical sidewall further defining an open end allowing access to the cylindrical interior recess;
- inserting a first end portion of the tubular brace member through the open end into the cylindrical interior recess; and
- coupling the tubular brace member to the fitting;
- wherein:
  - the tubular brace member defines a cylindrical hollow interior,
  - the fitting further defines an end wall opposite the open end,
  - a bore is formed through the end wall,
  - a fastener extends through the bore and into the cylindrical hollow interior of the tubular brace member,
  - the fastener is selectively repositionable relative to the fitting between a first orientation and a second orientation,
  - in the first orientation, the fastener defines a first effective length, and in the second orientation, the fastener defines a second effective length that is less that the first effective length, and
  - the method further comprises repositioning the fastener relative to the fitting to reposition the fastener between the first orientation and the second orientation.

13. The method of claim 12, wherein the method further comprising abutting the first end portion of the tubular brace member against the end wall.

14. The method of claim 12, wherein the substantially cylindrical sidewall defines a second bore therethrough, and wherein coupling the tubular brace member to the fitting comprises inserting a second fastener through the second bore and engaging an outer surface of the substantially cylindrical sidewall with the second fastener.

15. The method of claim 14, wherein the second bore is a threaded bore, the second fastener is a set screw, and the set screw can be tightened and loosened by rotating the set screw within the second bore relative to the fitting.

16. The method of claim 14, wherein the second fastener is oriented perpendicular to the tubular brace member.

17. The method of claim 12, wherein the fastener is concentric to the tubular brace member.

18. The method of claim 12, wherein:
- the bore is a threaded bore;
- the fastener defines a threaded tail end configured to rotatably engage the threaded bore; and
- repositioning the fastener relative to the fitting comprises rotating the threaded tail end within the bore relative to the fitting.

* * * * *